US006648390B1

(12) United States Patent
Yang

(10) Patent No.: US 6,648,390 B1
(45) Date of Patent: Nov. 18, 2003

(54) SINGLE-STACK TOOL RACK

(75) Inventor: Oinghao Yang, New Providence (BS)

(73) Assignee: Global Industries Holdings Ltd., Nassau (BS)

(*) Notice: Subject to any disclaimer, the term of this patent is extended or adjusted under 35 U.S.C. 154(b) by 0 days.

(21) Appl. No.: 10/151,328

(22) Filed: May 21, 2002

(51) Int. Cl.[7] ............................ A45F 5/00; A01K 97/06

(52) U.S. Cl. ........................... 294/161; 294/2; 294/143; 43/54.1; 206/821; 220/4.27; 211/131.1; 211/168; 312/201

(58) Field of Search ............................ 294/2, 142, 143, 294/144, 161; 206/315.11, 821; 220/4.27, 23.86, 23.87, 23.88, 23.89, 503–507; 43/54.1, 57.1; 312/202, 249.2, 285, 201, 283; 211/131.1, 144, 70.6, 168

(56) References Cited

U.S. PATENT DOCUMENTS

| | | | | | |
|---|---|---|---|---|---|
| 1,814,740 | A | * | 7/1931 | Rapp | 294/161 |
| 1,889,829 | A | * | 12/1932 | Govier et al. | 211/131.1 |
| 2,616,568 | A | * | 11/1952 | Bundgus | 294/161 |
| 2,775,498 | A | * | 12/1956 | Gettel | 312/287 |
| 3,498,471 | A | * | 3/1970 | Dirkx | 211/131.1 |
| 3,889,817 | A | * | 6/1975 | Berkman | 211/131.1 |
| 4,239,308 | A | * | 12/1980 | Bradley | 312/201 |
| 4,311,237 | A | * | 1/1982 | Hayes | 206/503 |
| 4,901,846 | A | * | 2/1990 | Lehman | 206/821 |
| 4,999,943 | A | * | 3/1991 | Crabtree | 43/54.1 |
| 5,799,787 | A | * | 9/1998 | Talbot | 206/315.11 |
| 5,813,528 | A | * | 9/1998 | Bliek et al. | 206/315.11 |
| 6,016,927 | A | * | 1/2000 | Krupp | 211/131.1 |

FOREIGN PATENT DOCUMENTS

| | | | | |
|---|---|---|---|---|
| EP | 445372 | * | 9/1991 | 211/70.6 |

* cited by examiner

*Primary Examiner*—Eileen D. Lillis
*Assistant Examiner*—Paul T. Chin
(74) *Attorney, Agent, or Firm*—Charles E. Baxley

(57) ABSTRACT

A single-stack tool rack is constructed to include a base having an upright pivot shaft, a plurality of tool boxes respectively pivoted to the upright shaft and arranged into a stack for keeping tools and/or accessories, a swivel case pivoted to the base and turned in and out of a bottom open chamber of the base for keeping tool bits, and a carrying handle formed of a handle body and a detachable hand tool and coupled to the upright pivot shaft of the base at the top.

20 Claims, 6 Drawing Sheets

SINGLE-STACK TOOL RACK

BACKGROUND OF THE INVENTION

1. Field of the Invention

The present invention relates to a tool rack and, more particularly, to single-stack tool rack, which comprises an upright pivot shaft, a plurality of tool boxes respectively pivoted to the upright pivot shaft and arranged in a stack, and a carrying handle provided at the top side of the upright pivot shaft. The carrying handle is formed of a handle body mountable to the upright pivot shaft, and a hand tool detachably connected to the handle body to serve as a handgrip.

2. Description of the Related Art

Various different designs of tool racks and boxes have been disclosed for use to hold tools and accessories, and have appeared on the market, illustrates a clip according to the prior art. In order to provide more compartments for holding more tools and/or accessories, the dimension of the tool rack or box should be relatively increased. However, it is inconvenient to carry a bulky or heavy tool rack from place to place.

SUMMARY OF THE INVENTION

The present invention has been accomplished under the circumstances in view. It is one object of the present invention to provide a single-stack tool rack, which requires less installation space. It is another object of the present invention to provide a single-stack tool rack, which can easily be carried from place to place by hand, or positively hung nails on the wall. It is still another object of the present invention to provide a single-stack tool rack, which enables the user to arrange storage items in good order. To achieve these and other objects of the present invention, the single-stack tool rack comprises a base, the base comprising an upright pivot shaft perpendicularly extended from a horizontal top face thereof; a plurality of tool boxes respectively pivoted to the upright pivot shaft of the base and arranged in a stack, the tool boxes each comprising a coupling ring respectively sleeved onto the upright pivot shaft of the base; a tool box positioning structure provided in the coupling rings of the tool boxes and the upright pivot shaft of the base for enabling the tool boxes to be horizontally turned about the upright pivot shaft and positioned in one of a series of angular positions; and a handle coupled to a top end of the upright pivot shaft, the handle comprising a handle body coupled to the upright pivot shaft, the handle body having a first end mountable to the upright pivot shaft and a second end, and a hand tool coupled to the second end of the handle body.

DETAILED DESCRIPTION OF THE PREFERRED EMBODIMENT

Figure 1:
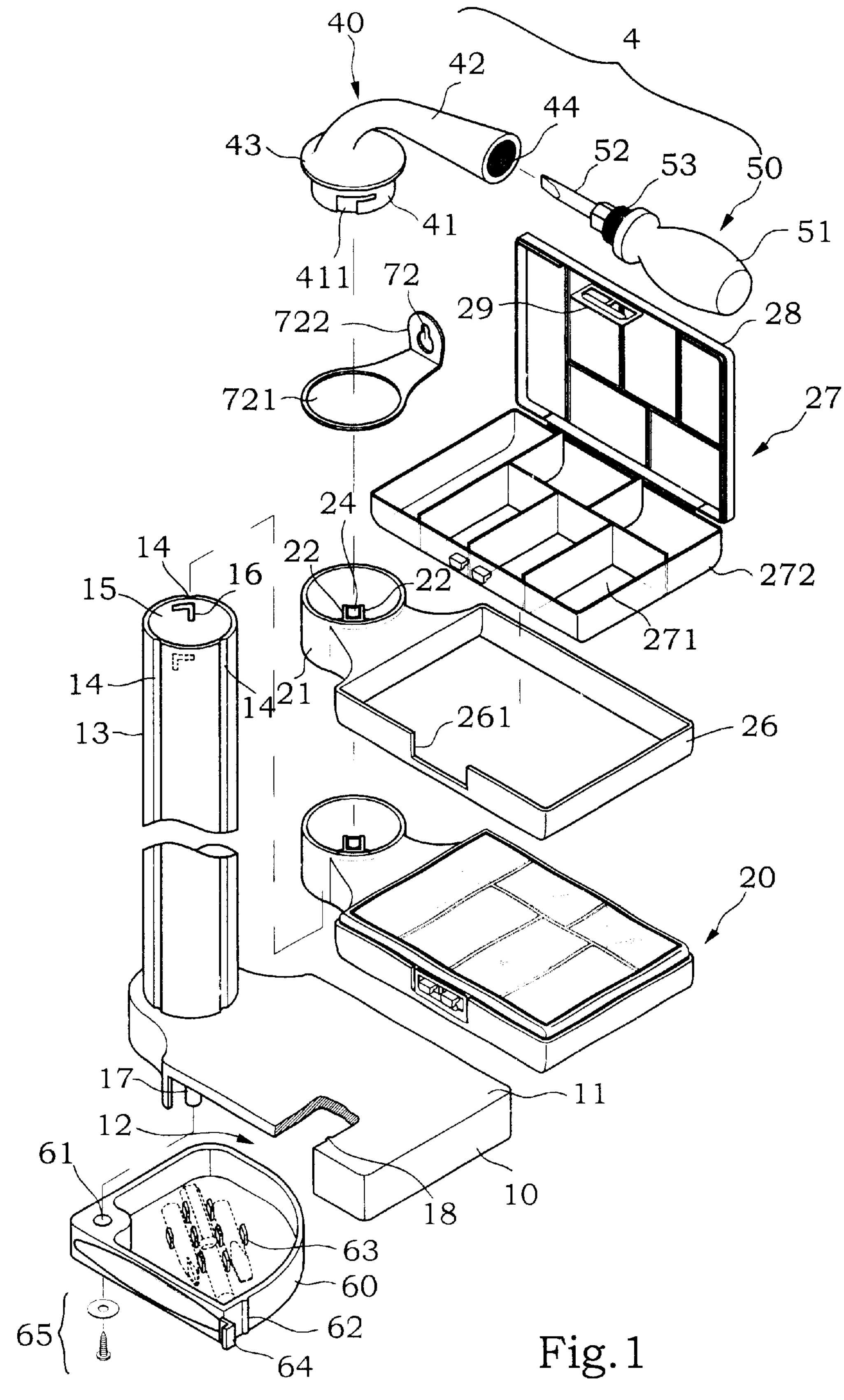
FIG. 1 is an exploded view of a single-stack tool rack according to the present invention.

Referring to FIG. 1 a single-stack tool rack is shown comprising a base 10, a stack of tool boxes 20, a tool box positioning structure, a handle 4, a handle fastening structure, a swivel case 60, and a hanging structure.

Figure 2:
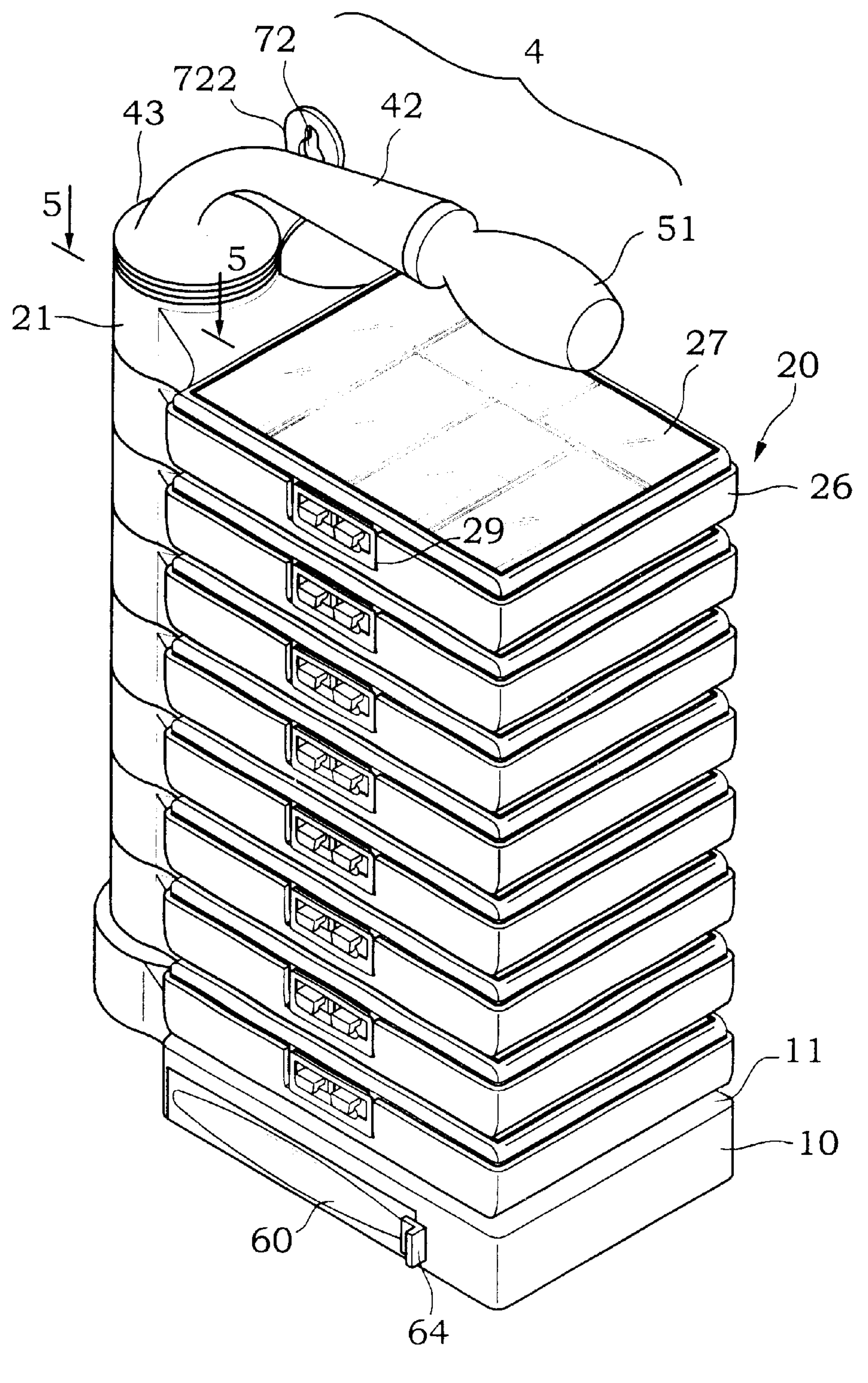
FIG. 2 is an oblique front elevation of the single-stack tool rack according to the present invention.

Referring to FIGS. 1 and 2, the base 10 has a horizontal top bearing face 11, a bottom open chamber 12, and an upright pivot shaft 13 perpendicularly extended from the horizontal top bearing face 11 near one side. The upright pivot shaft 13 has a top open section 15.

Figure 6:
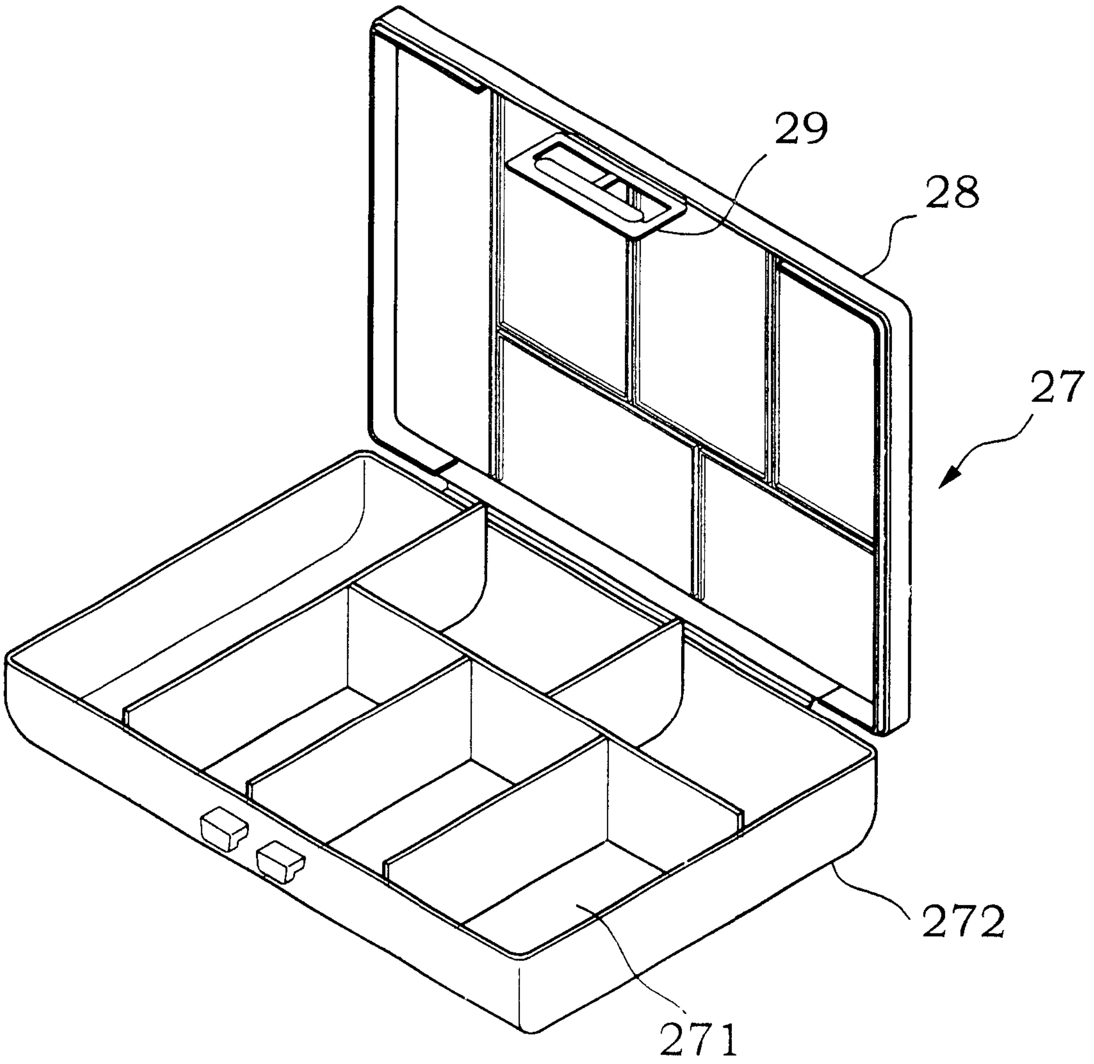
FIG. 6 is a perspective view of a box body for a tool box according to the present invention, showing the top cover opened.

Referring to FIGS. 1 and 2 again, the tool boxes 20 each comprise a carrier frame 26'. and a box body 27 carried in the carrier frame 26. The carrier frame 26 comprises a coupling ring 22 horizontally outwardly protruded from one end thereof and sleeved onto the upright pivot shaft 13 of the base 10 and secured in place by friction resistance between the periphery of the upright pivot shaft 13 and the inside wall of the coupling ring 21. The box body 27, as shown in FIG. 6, comprises a bottom shell 272 defining a plurality of compartments 271 for holding tools and/or accessories, a top cover 28 hinged to one side of the bottom shell 272 and adapted for closing the compartments 271, and a snap fastener 29 adapted for locking the box body 27 when the top cover 28 closed on the bottom shell 272. Further, each carrier frame 26 has a side opening 261 or 261 corresponding to the snap fastener 29, for enabling the user to access to the snap fastener 29 conveniently.

Figure 5:
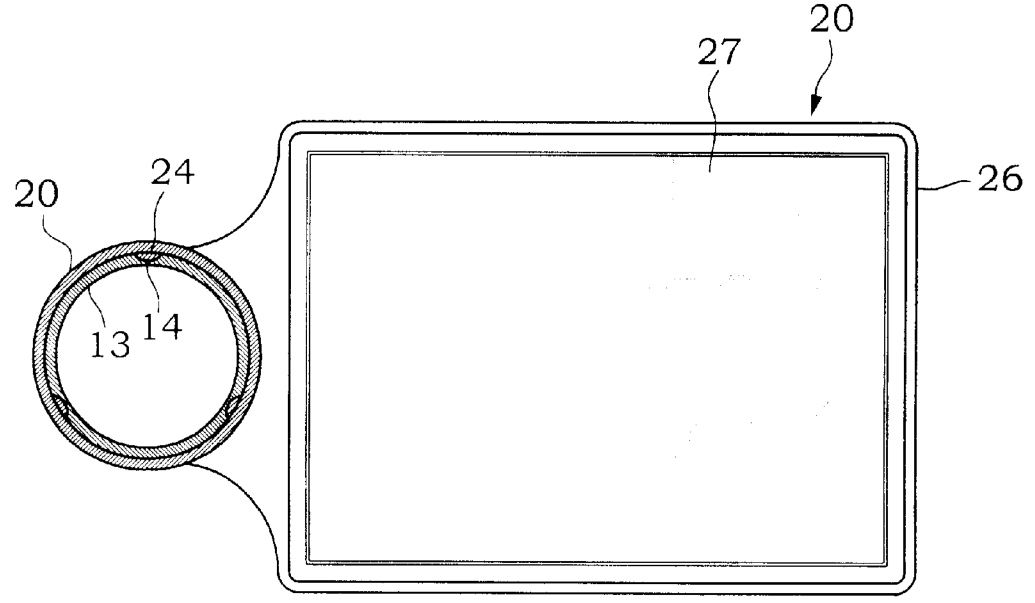
FIG. 5 is a sectional view taken along line 5—5 of FIG. 2.

The aforesaid tool box positioning structure is provided for controlling the positioning of the tool boxes 20. The tool box positioning structure, as shown in FIGS. 1 and 5, comprises a plurality of longitudinal grooves 14 equiangularly spaced around the periphery of the upright pivot shaft 13, and a plurality of retaining spring strips (see also reference sign 24) respectively formed integral with the coupling rings 21 of the carrier frames 26 of the tool boxes 20 by cutting two axially extended cuts 22 in each coupling ring of the carrier frames 26 of the tool boxes 20, which retaining spring strips each having a projection 24 adapted for engaging one longitudinal groove 14 of the upright pivot shaft 13 of the base 10. After installation of the tool boxes 20, the projections 24 of the retaining springs are respectively engaged into the longitudinal grooves 14 of the upright shaft 13 of the base 10, preventing the tool boxes 20 from rotary motion relative to the upright pivot shaft 13 of the base 10. However, when the user turns one tool box 20 about the upright pivot shaft 13 of the base 10 with the hand, the projection 24 is moved with the respective coupling ring 21 away from the corresponding longitudinal groove 14 of the upright pivot shaft 13 of the base 10, enabling the respective tool box 20 to be turned about the upright pivot shaft 13 of the base 10 to the desired direction.

Figure 4:
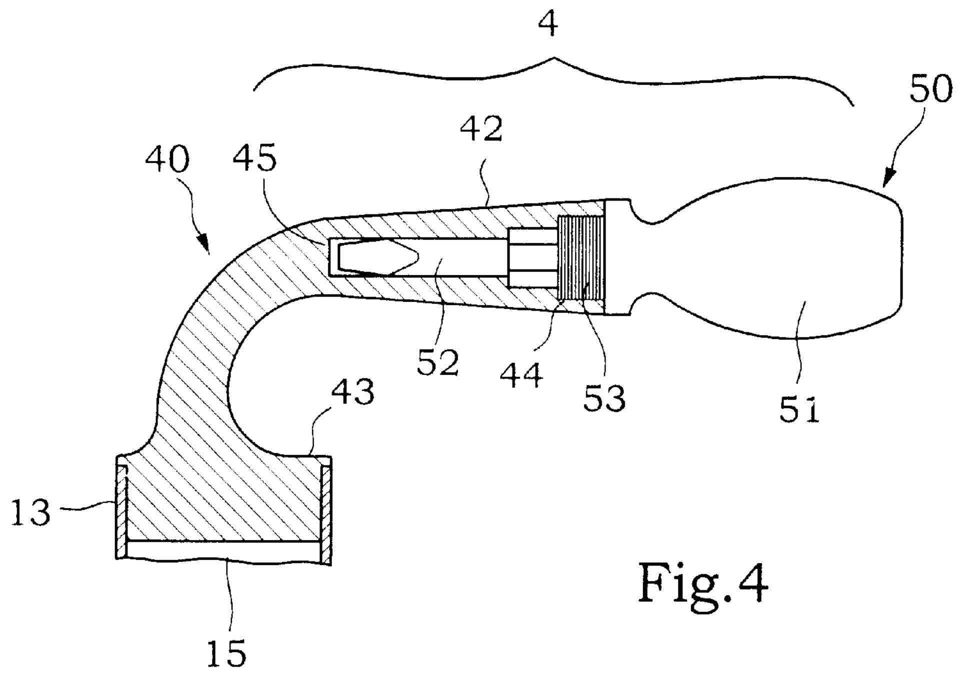
FIG. 4 is a sectional view of the handle according to the present invention.

Referring to FIG. 4 and FIGS. 1 and 2 again, the aforesaid handle 4 comprises a handle body 40 and a hand tool 50. The handle body 40 comprises a mounting block 41 press-fitted into the top open section 15 of the upright pivot shaft 13 of the base 10, a hollow shank 42 extended from the mounting block 41 and smoothly curved in one direction, and a collar 43 radially outwardly extended around the connection area between the mounting block 41 and the shank 42 and stopped at the topmost edge of the upright pivot shaft 13 of the base 10. The hollow shank 42 has an axial hole 45 axially extended to the free end (the end remote from the shoulder 43) and an inner thread 44 in the axial hole 45. The hand tool 50 comprises a handle 51 and a threaded shoulder 53 disposed at one end of the handle 51 and adapted for detachably holding a tool bit 52 and threading into the inner thread 44 of the shank 42. The axial hole 45 is large enough for receiving the tool bit 52 and the threaded shoulder 53 of the hand tool 50.

The aforesaid handle fastening structure. as shown in FIG. 1 comprises at least one, for example, two angled retaining slots 411 symmetrically formed in the periphery of the mounting block 41 of the handle body 40, and two angled retaining ribs 16 protruded from the inside wall of the top open section 15 of the upright pivot shaft 13 of the base 10 and adapted for engaging into the angled retaining slots 411 of the mounting block 41 of the handle body 40 through a rotary motion. When inserting the mounting block 41 of the handle body 40 into the top open section 15 of the upright pivot shaft 13, the angled retaining slots 411 are respectively aimed at the angled retaining ribs 16. After the mounting block 41 of the mounting block 41 of the handle body 40 press-fitted into the top open section 15 of the upright pivot shaft 13. the handle body 40 is rotated through an angle to force the angled retaining ribs 16 into engagement with the angled retaining slots 411. stopping axial movement of the mounting block 41 of the handle body 40 relative to the upright pivot shaft 13 of the base 10.

Figure 7:
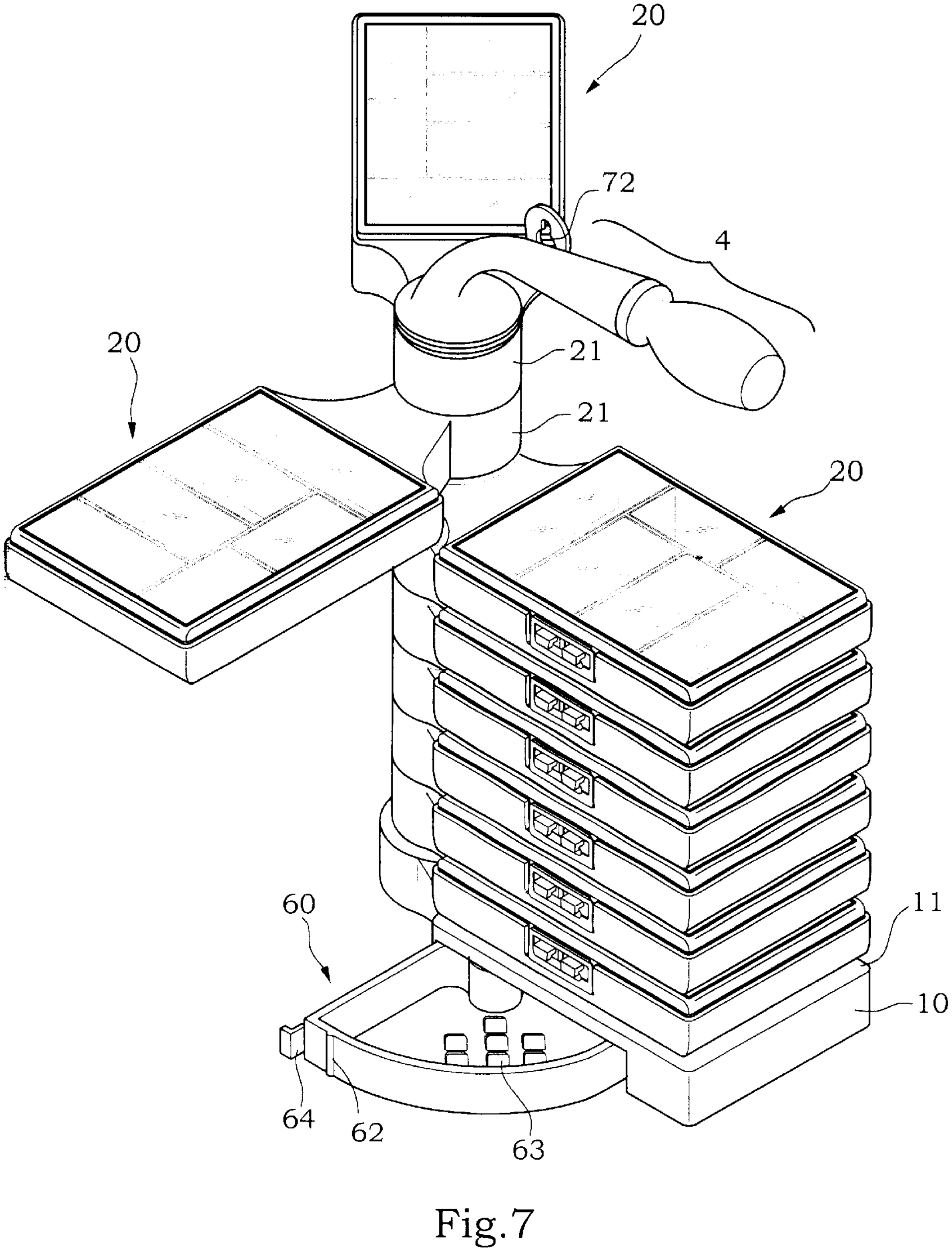
FIG. 7 is an applied view of the single-stack tool rack according to the present invention.

Referring to FIG. 7 and FIGS. 1 and 2 again. the swivel case 60 is mounted in the bottom open chamber 12 of the base 10. A pivoting structure and a positioning structure are provided between the swivel case 60 and the bottom open chamber 12 of the base 10 for enabling the swivel case 60 to be moved in and out of the bottom open chamber 12 of the base 10 and positioned in the inside or outside of the bottom open chamber 12 of the base 10. The pivoting structure comprises a downward pivot rod 17 downwardly extended from the top sidewall of the bottom open chamber 12, a pivot hole 61 extended through top and bottom sidewalls of the swivel case 60 near one side and coupled to the downward pivot rod 17, and a fastening device (screw and washer) 65 mounted in the pivot hole 61 and fastened to the downward pivot rod 17 to secure the swivel case 60 to the downward pivot rod 17, enabling the swivel case 60 to be turned in and out of the bottom open chamber 12 of the base 10 about the downward pivot rod 17. The positioning structure comprises a first locating rib 62 protruded from the periphery of the swivel case 60, and a second locating rib 18 respectively formed integral with the inside wall of the base 10 inside the bottom open chamber 12 and adapted for stopping the first locating rib 62. When the swivel case 60 received inside the bottom open chamber 12 of the base 10, the first locating rib 62 is stopped at one side, namely, the inner side of the second locating rib 18, holding the swivel case 60 positively in the bottom open chamber 12 of the base 10. When pulling the swivel case 60 outwards from the bottom open chamber 12 of the base 10 with force, the first locating rib 62 is moved over the second locating rib 18, enabling the swivel case 60 to be turned about the downward pivot rod 17 to the outside of the bottom open chamber 12 of the base 10. The swivel case 60 comprises a plurality of clamps 63 disposed on the inside and adapted for holding a set of tool bits 52.

Figure 3:
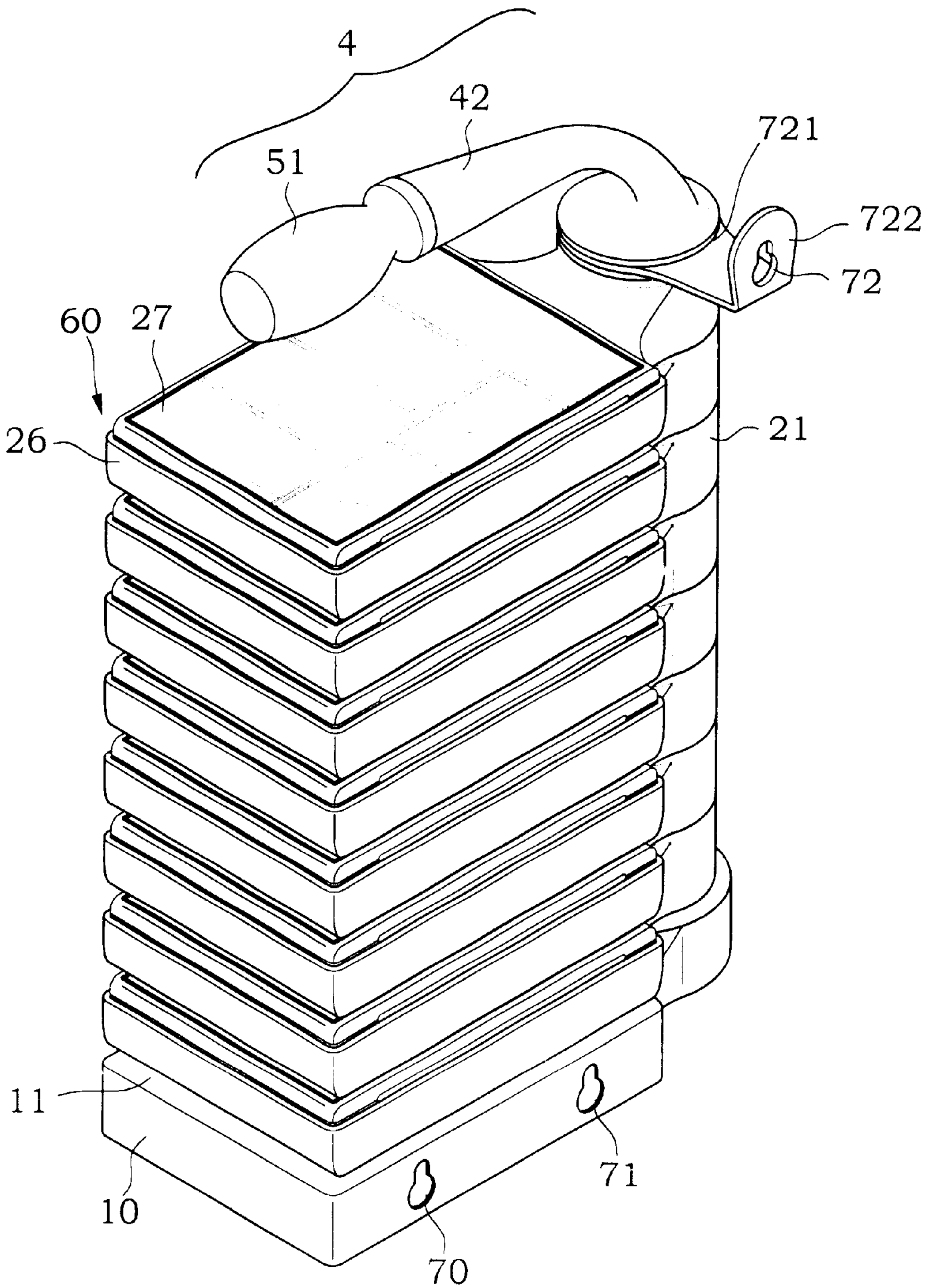
FIG. 3 is an oblique rear elevation of the single-stack tool rack according to the present invention.

Referring to FIG. 3 and FIGS. 1 and 2 again, the aforesaid hanging structure comprises a plurality of keyway-like hanging holes 70; 71; 72. The hanging holes 70; 71 are provided in the back sidewall of the base 10 and horizontally aligned. The hanging hole 72 is formed in the angled rear end 722 of a hanging plate 721, which is coupled to the upright pivot shaft 13 and stopped between the collar 43 of the handle body 40 and the topmost edge of the upright pivot shaft 13 of the base 10. By means of the hanging holes 70; 71; 72, the single-stack tool rack can be positively hung on nails in the wall of the working place.

Referring to FIGS. 2, 3, and 7, through the handle 4, the single-stack tool rack can conveniently be carried from place to place by hand. Further, the user can turn every selected tool box 20 horizontally about the upright pivot shaft 13 to the desired angle convenient for picking up storage items from the compartments 271 of the respective box body 27.

As indicated above, the single-stack tool rack of the present invention achieves the following advantages:

a) Because the tool boxes 20 are arranged in a stack, the tool rack requires less installation space.

b) The hand tool 50 serves as a handgrip when fastened to the handle body 40, and can be detached from the handle body 40 for independent use.

c) The tool boxes 20 can horizontally be turned about the upright pivot shaft 13 and quickly positively positioned in the desired angular position convenient for enabling the user to pick up storage items.

d) The box bodies 27 of the tool boxes 20 can be made transparent and marked with things convenient for classification of storage items.

e) Because the swivel case 60 is provided with clamps 63 for holding tool bits 52 positively in position, storage tool bits 52 do not move when the user carrying the single-stack tool box from one place to another.

f) The box bodies 27 and the carrier frames 26 of the tool boxes 20 are detachable so that the user can carry the box bodies 27 away from the carrier frames 26 for arranging storage items.

g) The single-stack tool rack can conveniently positively hung on nails in the wall.

A prototype of single-stack tool rack has been constructed with the features of FIGS. 1~7. The single-stack tool rack functions smoothly to provide all of the features discussed earlier.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A single-stack tool rack comprising:

a base, said base comprising an upright pivot shaft perpendicularly extended from a horizontal top face thereof;

a plurality of tool boxes respectively pivoted to said upright pivot shaft of said base and arranged in a stack, said tool boxes each comprising a coupling ring respectively sleeved onto said upright pivot shaft of said base;

a tool box positioning structure provided in the coupling rings of said tool boxes and the upright pivot shaft of said base for enabling said tool boxes to be horizontally turned about said upright pivot shaft and positioned in one of a series of angular positions; and a handle coupled to a top end of said upright pivot shaft, said handle comprising a handle body coupled to said upright pivot shaft, said handle body having a first end mountable to said upright pivot shaft and a second end, and a hand tool coupled to the second end of said handle body.

2. The single-stack tool rack as claimed in claim 1, further comprising a tool box positioning structure, said tool box positioning structure comprising a plurality of longitudinal grooves equiangularly spaced around the periphery of said upright pivot shaft of said base, and a plurality of spring strips respectively formed integral with the coupling rings of said tool boxes, said spring strips each comprising a projection adapted for engaging said longitudinal grooves.

3. The single-stack tool rack as claimed in claim 1, wherein said tool boxes each comprise a carrier frame and a box body carried in said carrier frame; said coupling rings of said tool boxes are respectively extended from the carrier frames of said tool boxes at side.

4. The single-stack tool rack as claimed in claim 3, wherein the box body of each of said tool boxes is comprised of a bottom shell defining a plurality of compartments for keeping storage items, a top cover hinged to one side of said bottom shell and adapted for closing said compartments, and a snap fastener installed in said bottom shell and said top cover and adapted for locking said top cover when said top cover closed on said bottom shell.

5. The single-stack tool rack as claimed in claim 4, wherein the carrier frame of each of said tool boxes has an opening in one side wall thereof corresponding to the snap fastener of the box body of the respective tool box.

6. The single-stack tool rack as claimed in claim 1, wherein said upright pivot shaft of said base comprises a top open section adapted for receiving said handle body of said handle.

7. The single-stack tool rack as claimed in claim 6, wherein said handle body comprises a mounting block mountable to the top open section of said upright pivot shaft of said base, a hollow shank adapted for receiving said hand tool, and a collar connected between said mounting block and said hollow shank and adapted for stopping said hollow shank outside said upright pivot shaft after connection of said mounting block to the top open section of said upright pivot shaft.

8. The single-stack tool rack as claimed in claim 7, further comprising a handle fastening structure adapted to secure said mounting block of said handle body to the top open section of said upright pivot shaft of said base.

9. The single-stack tool rack as claimed in claim 8, wherein said handle fastening structure comprises a plurality of angled retaining slots disposed in the periphery of said mounting block of said handle body, and a plurality of angled retaining ribs respectively protruded from an inside wall of said top open section of said upright pivot shaft of said base and adapted for engaging into said angled retaining slots.

10. The single-stack tool rack as claimed in claim 7, wherein said hand tool comprises a handle and a threaded shoulder disposed at one end of the handle of said hand tool and adapted for detachably holding a tool bit and threading into one end of said hollow shank remote from said collar.

11. The single-stack tool rack as claimed in claim 1, wherein said base comprises a bottom open chamber, and a swivel case mounted in said bottom open chamber.

12. The single-stack tool rack as claimed in claim 11 further comprising a pivoting structure provided between said bottom open chamber of said base and said swivel case for enabling said swivel case to be turned in and out of said bottom open chamber, and a tool case positioning structure for enabling said swivel case to be positioned inside said bottom open chamber of said base.

13. The single-stack tool rack as claimed in claim 12, wherein said pivoting structure comprises a downward pivot rod suspended inside said bottom open chamber of said base, and pivot hole formed in one end of said swivel case and coupled to said downward pivot rod.

14. The single-stack tool rack as claimed in claim 13, wherein said pivoting structure further comprises fastening means fastened to said downward pivot rod to secure said swivel case to said downward pivot rod and to let said swivel case be turned in and out of said bottom open chamber of said base about said pivot rod.

15. The single-stack tool rack as claimed in claim 14, wherein said fastening means is comprised of a screw and a washer.

16. The single-stack tool rack as claimed in claim 12, wherein said swivel case positioning structure comprises a first locating rib protruded from the periphery of said swivel case, and a second locating rib formed integral with an inside wall of said base inside said bottom open chamber and adapted for stopping said first locating rib by friction resistance to hold said swivel case inside said bottom open chamber of said base.

17. The single-stack tool rack as claimed in claim 1, wherein said swivel case comprises a plurality of clamps adapted for holding tool bits inside said swivel case.

18. The single-stack tool rack as claimed in claim 1 further comprising a hanging structure for hanging.

19. The single-stack tool rack as claimed in claim 18, wherein said hanging structure comprises a plurality of hanging holes arranged in three corners in said base.

20. The single-stack tool rack as claimed in claim 19, wherein said hanging holes include a first hanging hole and a second hanging hole respectively disposed in a back sidewall of said base and horizontally aligned, and a third hanging hole formed in a hanging plate fastened to said upright pivot shaft of said base.

* * * * *